United States Patent
Seghi et al.

(10) Patent No.: US 10,189,117 B2
(45) Date of Patent: Jan. 29, 2019

(54) ADHESION IMPROVEMENT VIA MATERIAL NANOSTRUCTURING OR TEXTURIZING

(71) Applicant: The United States of America as represented by the Secretary of the Navy, Washington, DC (US)

(72) Inventors: Steve Seghi, Bloomington, IN (US); Jason Kalishek, Bloomington, IN (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 734 days.

(21) Appl. No.: 14/587,455

(22) Filed: Dec. 31, 2014

(65) Prior Publication Data
US 2015/0202712 A1  Jul. 23, 2015

Related U.S. Application Data

(60) Provisional application No. 61/922,634, filed on Dec. 31, 2013.

(51) Int. Cl.
*B23K 26/00* (2014.01)
*B23K 26/352* (2014.01)
(Continued)

(52) U.S. Cl.
CPC ........ *B23K 26/355* (2018.08); *B23K 26/0006* (2013.01); *B23K 26/0624* (2015.10);
(Continued)

(58) Field of Classification Search
CPC ............ B23K 26/0006; B23K 26/0084; B23K 26/0624; B23K 2203/04; B23K 2203/05;
(Continued)

(56) References Cited

U.S. PATENT DOCUMENTS

| 5,558,789 A | 9/1996 | Singh |
| 6,159,832 A | 12/2000 | Mayer |

(Continued)

FOREIGN PATENT DOCUMENTS

| WO | PCT/US2007/079897 A2 | 8/2008 |
| WO | 2012163351 | 12/2012 |
| WO | 2014025332 | 2/2014 |

OTHER PUBLICATIONS

Definition of "restructure", accessed Feb. 1, 2018, http://www.dictionary.com/browse/restructure.*

(Continued)

*Primary Examiner* — Dana Ross
*Assistant Examiner* — Brandon Harvey
(74) *Attorney, Agent, or Firm* — Christopher A. Monsey

(57) ABSTRACT

A embodiment of the invention includes providing a system and method in accordance with an embodiment of the invention including processing a target surface of interest to adjust interfacial material characteristics such as increasing surface area and/or chemical interaction properties via laser texturizing such as via increasing porosity. An embodiment can include an ultrashort pulse laser (USPL), wherein laser pulses are of a duration of femtoseconds, and adapting the USPL's laser energy output irradiance to athermally convert the target surface of interest's material into a plasma state for re-deposition on the target surface; applying the exemplary embodiment's laser beam energy in a raster pattern across the target surface, wherein the USPL is adapted to nano-structure or texturize the target surface to produce a region having a surface covered by texturized structures that can include nano structures increasing adhesion or chemical reaction properties of the target surface.

15 Claims, 5 Drawing Sheets

(51) Int. Cl.
*B23K 26/0622* (2014.01)
*B23K 103/00* (2006.01)
*B23K 103/04* (2006.01)
*B23K 103/08* (2006.01)
*B23K 103/10* (2006.01)
*B23K 103/14* (2006.01)

(52) U.S. Cl.
CPC ...... *B23K 2103/04* (2018.08); *B23K 2103/05* (2018.08); *B23K 2103/08* (2018.08); *B23K 2103/10* (2018.08); *B23K 2103/14* (2018.08); *B23K 2103/42* (2018.08); *B23K 2103/52* (2018.08); *B23K 2103/54* (2018.08)

(58) Field of Classification Search
CPC ............ B23K 2203/08; B23K 2203/10; B23K 2203/14; B23K 2203/42; B23K 2203/52; B23K 2203/54
See application file for complete search history.

(56) References Cited

U.S. PATENT DOCUMENTS

| | | | |
|---|---|---|---|
| 6,312,768 | B1 | 11/2001 | Rode |
| 7,103,076 | B2 | 12/2006 | Kitaoka |
| 2002/0173778 | A1 | 11/2002 | Knopp et al. |
| 2005/0173387 | A1 | 8/2005 | Fukuyo et al. |
| 2005/0274702 | A1 | 12/2005 | Deshi |
| 2006/0039419 | A1 | 2/2006 | Deshi |
| 2006/0138102 | A1 | 6/2006 | Sawada et al. |
| 2007/0051706 | A1 | 3/2007 | Bovatsek et al. |
| 2008/0124486 | A1 | 5/2008 | Sawada et al. |
| 2010/0047587 | A1 | 2/2010 | Itoh et al. |
| 2010/0084384 | A1 | 4/2010 | Bovatsek et al. |
| 2010/0219506 | A1* | 9/2010 | Gupta ............... B23K 26/0084 257/618 |
| 2011/0207328 | A1 | 8/2011 | Speakman |
| 2011/0248372 | A1 | 10/2011 | Kurita |
| 2012/0067855 | A1 | 3/2012 | Guo et al. |
| 2012/0328905 | A1 | 12/2012 | Guo et al. |
| 2013/0211390 | A1* | 8/2013 | Bor ..................... A61F 9/008 606/5 |
| 2013/0344302 | A1 | 12/2013 | Helie et al. |
| 2014/0154526 | A1 | 6/2014 | Guo et al. |
| 2014/0193607 | A1* | 7/2014 | Browning ............ C25D 11/04 428/138 |
| 2014/0239552 | A1 | 8/2014 | Srinivas et al. |
| 2014/0273535 | A1 | 9/2014 | Gupta et al. |
| 2014/0332499 | A1 | 11/2014 | Palmaz et al. |
| 2015/0038313 | A1 | 2/2015 | Hosseini |
| 2015/0064407 | A1 | 3/2015 | Bruck et al. |

OTHER PUBLICATIONS ntrs.nasa.gov/serach.jsp?R=20130013699; "Supersonic Retropulsion Surface Preparation of Carbon Fiber Reinforced Epoxy Composites for Adhesive Bonding", Frank L. Palmieri, Marcus A. Belcher, Christopher J. Wohl, Kay Y. Blohowiak, and John W. Connell; publication date: May 6, 2013; 14 pages.

Matthew S. Brown and Craig B. Arnold, Fundamentals of Laser-Material Interaction and Application to Multiscale Surface Modification, 2010, pp. 91-120, Springer Berlin Heidelberg.

Yasumaru, N. et al., Femtosecond-laser-induced nanostructure formed on hard think films of TiN and DLC, Appl. Phys. A 76, 983-985 (2003); 3 pages.

Hiraoka, H. et al., Laser-Induced Sub-Half-Micrometer Periodic Structure on Polymer Surfaces, Applied physics letters, v. 64, (5), Jan. 31, 1994, 1 page.

Derrien, Thibault et al., Rippled area formed by surface plasmon polaritons upon femtosecond laser double-pulse irradiation of silicon, Optics Express, Dec. 2, 2013, vol. 21, No. 24; 13 pages.

Balling, Peter, et al., Short-pulse metal structuring: a method for modifying surface adhesion properties, Proc. of SPIE vol. 6880; 9 pages.

* cited by examiner

| | |
|---|---|
| % Increase over best performing unprimed samples | 19.0% |
| % Increase over unprimed samples (average) | 29.4% |
| % Increase over primed samples (average) | 11.8% |

ADHESION IMPROVEMENT VIA MATERIAL NANOSTRUCTURING OR TEXTURIZING

CROSS-REFERENCE TO RELATED APPLICATIONS

The present application claims priority to U.S. Provisional Patent Application Ser. No. 61/922,634, filed Dec. 31, 2013, entitled "ADHESION IMPROVEMENT VIA SURFACE NANOSTRUCTURING," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 103,030) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE INVENTION

The present invention relates to a process, system, and/or a structure adapted to produce or have adhesion improvement(s) associated with surface nano-structuring. An exemplary embodiment of the invention can improve various attributes of a material so treated to include improved adhesion as well as shear strength.

Surface adhesion functionality can be enhanced via mechanical abrasion, acid etching, plasma etching, or chemical bonding agents. Such approaches or methods associated with mechanical abrasion, acid etching, plasma etching, or chemical bonding agents serve to either increase surface area and mechanical engagement capacity (collectively, surface roughness) or increase the surface's ability to chemically bind with a given adhesive. Some deficiencies of these methods are listed as follows: difficult to control; damages the treated surface; removes desirable material from a surface; time/labor intensive; and require costly and hazardous chemicals. Such adhesion improvement methods associated with mechanical abrasion, acid etching, plasma etching, or chemical bonding agents are inherently limited in the minimum precision, scale, and accuracy of functional improvements they facilitate.

Adhesion advancements can be based on an application of lasers to ablate material from a surface in order to create a desired surface morphology. While this ablative approach facilitates generation of adhesion-enhancing surface features, which are smaller and more controllable versus alternative surface enhancement techniques, ablation methods remove material, are limited in the minimum scale of the morphologies they can generate, and can inflict thermal damage to a target surface.

According to an illustrative embodiment of the present disclosure, exemplary methods and structures are provided with desirable attributes such as adhesion improvement associated with surface nano-structuring. Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Figure 1:
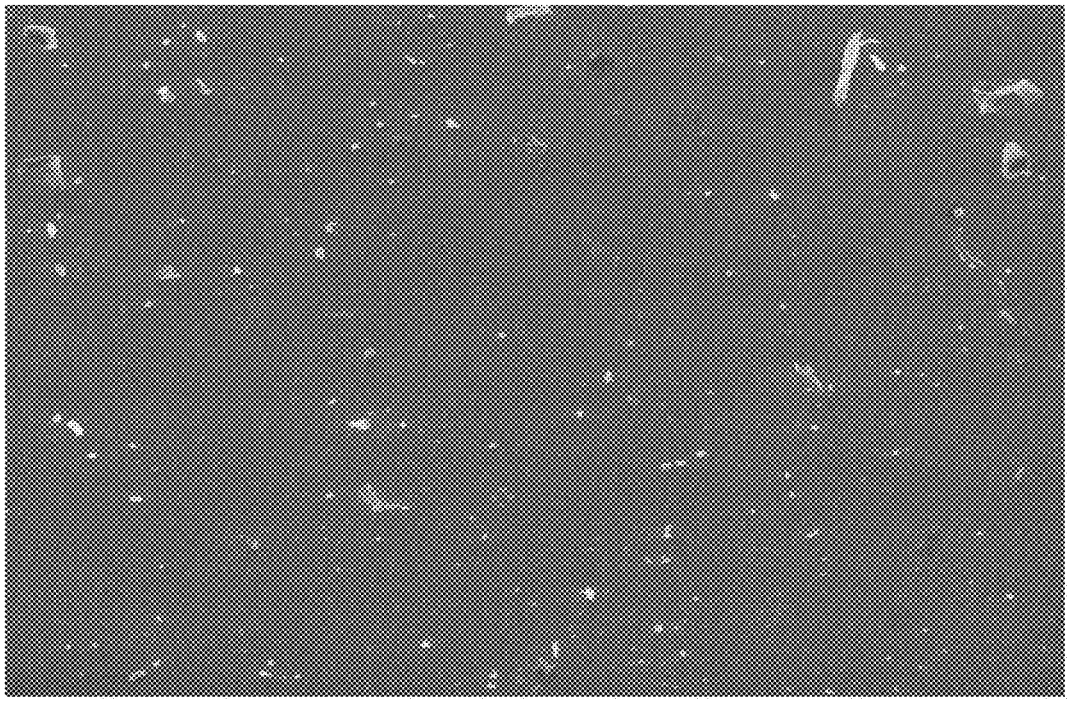
FIG. 1 shows an untreated metallic surface image.
Figure 2:
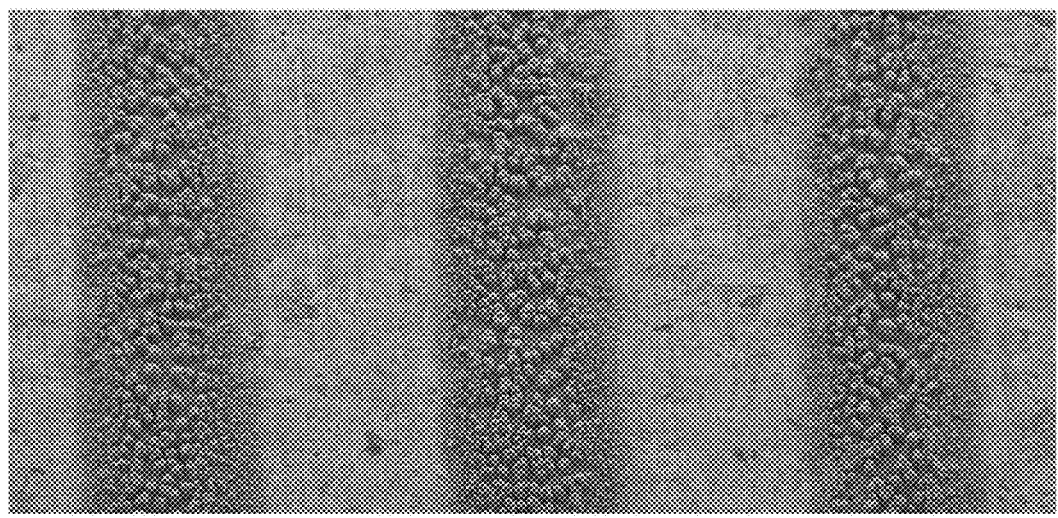
FIG. 2 shows treated beam paths in accordance with an embodiment of the invention.
Figure 3:
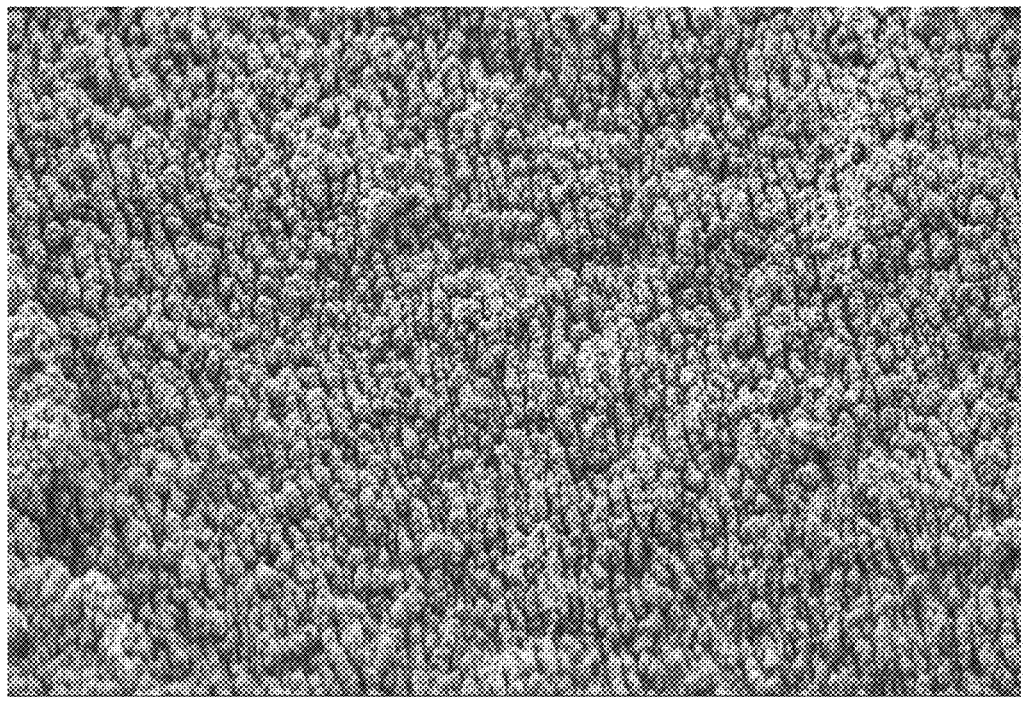
FIG. 3 shows a magnified image of a FIG. 2 path.
Figure 4:
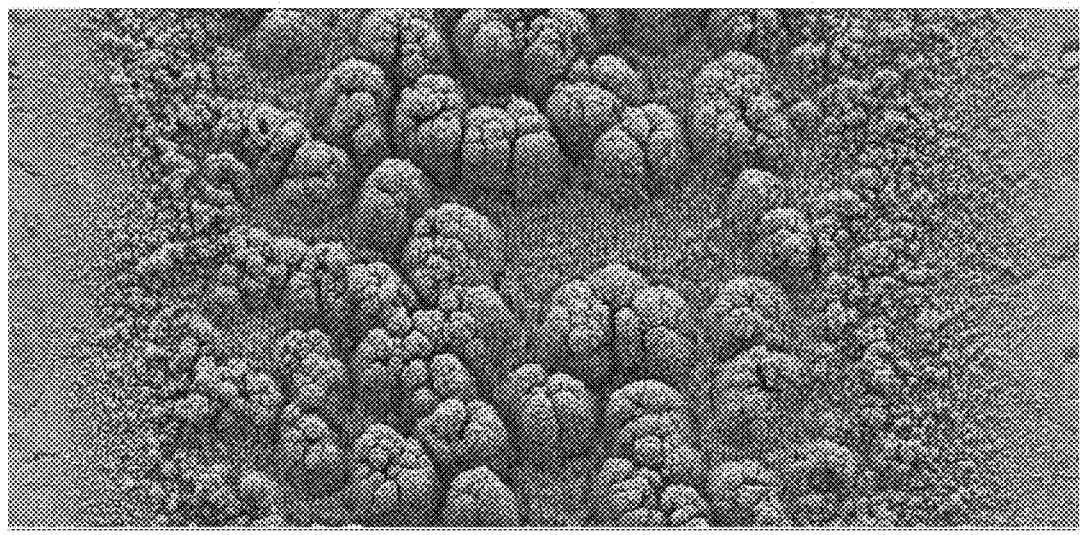
FIG. 4 shows an increased magnification of the FIG. 3 image.
Figures 5, 6:
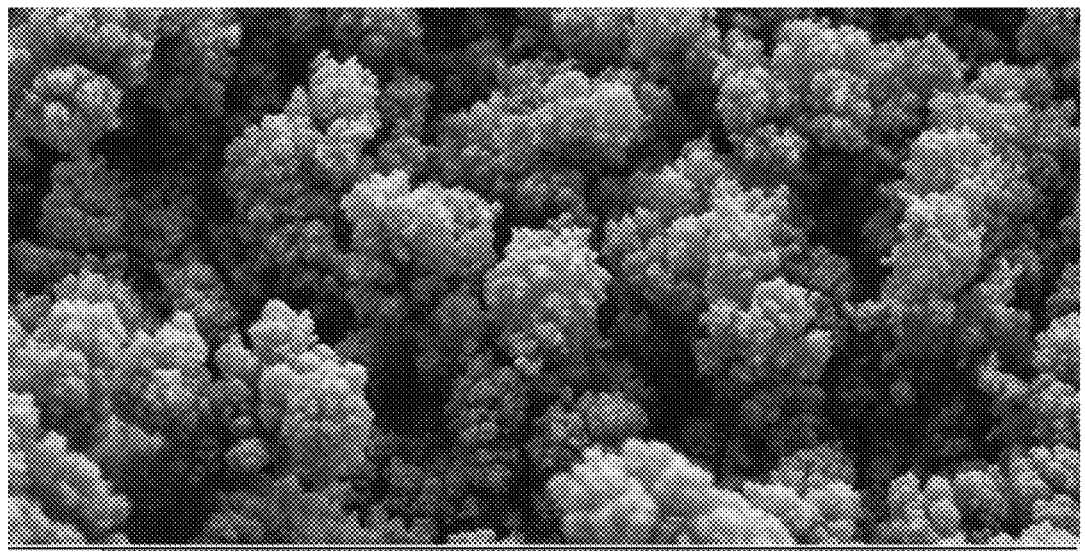
FIG. 5 shows a further increased magnification of the FIGS. 2, 3 and 4 images.
FIG. 6 provides a data table with mechanical test data associated with testing of a structure treated in accordance with an embodiment of the invention.

The embodiments of the invention described herein are not intended to be exhaustive or to limit the invention to precise forms disclosed. Rather, the embodiments selected for description have been chosen to enable one skilled in the art to practice the invention.

An exemplary process in accordance with an embodiment of the invention presents an improvement over the ablation process discussed above. Rather than ablating a target surface, one or more embodiments of the invention apply ultra-short pulses of energy on the order of femtoseconds (fs) to restructure or texturize a target surface athermally with a desired texture or three dimensional structure which avoids, minimizes, or reduces damaging the restructured or texturized material. One purpose of surface restructuring is to create improved adhesion and/or chemical qualities of the material such as increasing interfacial mechanical properties to include substantial increases in surface area for mechanical interlocking and chemical reaction. Such an approach can reduce or eliminate use of hazardous chemical treatments to provide increased or altered surface adhesion or chemical reaction properties. In some embodiments, target surface or areas are fulminated in a way that permits redeposit of at least some of the target surface or area's material in a desired pattern and depth such a fractal-like pattern or another raster based pattern. An embodiment of the invention can be a mass-production scalable process, which generates a substantial level of surface area enhancement. An embodiment of the invention can also be applicable to one or more metallic substances and a number of non-metallic solid surfaces including, but not limited to, ceramics. An exemplary embodiment apparatus and process can fulminate surface material using and re-deposit that material on the surface of interest in order to texturize or add porosity to material or surface of interest that adds or alters the material or surface of interest's surface area and/or chemical bonding or interaction characteristics.

One exemplary embodiment of the invention includes a surface enhancement process and system. For example, an exemplary system adapted to perform a process in accordance with one embodiment of the invention includes (1) Ultra-short pulse laser (USPL) system; (2) An apparatus for rastering the USPL output over a target surface of interest;

a (3) System to control environmental conditions around the target surface of interest e.g., adhered surfaces to be modified.

The exemplary laser energy output irradiance can be adapted in accordance with an embodiment of the invention to be sufficient to athermally convert the target surface of interest's material into a plasma state during application of the energy output. The target surface of interest can be exposed to the exemplary embodiment's laser beam energy wherein the laser beam is rastered across a region to be processed within the target surface of interest, adjusting one or more positions of the beam relative to the region to be processed by the width of the beam's functional beam diameter with each pass of the laser. Given an irradiance, pulse duration, pulse frequency, laser wavelength, laser polarization, rastering scheme, and chemical and atmospheric environment at the target surface all of which are determined and adapted to nano-structuring the region to be processed, a resultant processed region's surface will be covered by physical nano structures. These resultant athermally produced nano structures alter the surface of the processed material to include increasing surface area at the surface of the region of material processed thereby increasing chemical bonding properties and adhesion properties of the surface of the region of material processed.

In particular, an untreated material surface is shown in FIG. 1, followed by various treated examples of the same material in FIGS. 2, 3, 4, and 5 processed in accordance with one or more embodiments of the invention. FIGS. 2-5 show alteration in structure or texturing of treated material or target surfaces which increases, for example, porosity that alters or increases surface adhesion or interfacial chemical properties of the treated material surfaces. FIG. 6 contains preliminary mechanical test data showing the overall increase or alteration in surface adhesion or interfacial chemical properties after treatment.

In general, a method of processing in accordance with an embodiment of the invention can include: Providing a USPL operating with a pulse duration on the order of femtoseconds, a system adapted for rastering the USPL output over a target surface of interest, and a system to control environmental conditions around the target surface of interest e.g., adhered surfaces to be modified. Next, determining the USPL's laser energy output irradiance to athermally convert the target surface of interest's material to a pre-determined depth into a plasma state during application of the USPL's energy output. Next, exposing the target surface of interest to the exemplary embodiment's laser beam energy wherein the laser beam is programmed to be rastered, in a predetermined path, to a predetermined depth, and on a predetermined angle to the target surface, across a region to be processed that may encompass all or be within the target surface of interest, adjusting one or more positions of the beam relative to the region to be processed by the width of the beam's functional beam diameter (or spot size) with each pass of the laser, wherein given an irradiance, pulse duration, pulse frequency, laser wavelength, laser polarization, rastering scheme, and chemical and atmospheric environment at the target surface's material all of which are adapted for nano-structuring or texturizing the region to be processed, a resultant processed region's surface will be covered by physical nano structures that can comprise three dimensional structures or alterations or increased porosity of the region to be processed. In one embodiment, resultant athermally produced nano structures or increased porosity alter the surface of the region to be processed to include increasing surface area and thereby increasing chemical bonding properties and/or adhesion properties of the target surface or surface of the region to be processed.

For example, one embodiment can use the following parameters: Raydiance fiber laser, spot size of 70 μm, pulse duration of 700 fs, pulse energy of 32 μJ, average power of 3.2 W, pulse frequency of 100 kHz, wavelength of 1550 nm, and a raster pattern of square, single pass at room temperature. Materials such as Aluminum 2024, 17-4 stainless steel, 1018 carbon steel, and titanium can be processed in accordance with embodiments of the invention.

More generally, an embodiment of the process can be used to effectively nano-structure or texturize surface(s) of a variety of metals including, but not limited to, aluminum, tungsten, steel, alloys of these metals, etc. The process is also effective on ceramics and other non-metals. Also contemplated are materials such as glass, plastics, etc. An embodiment of the process can be accomplished in ambient atmosphere and is well suited to be performed in other environments to achieve the desired surface restructuring (e.g., in a vacuum). Rastering of the USPL beam in one embodiment of the process can include use a single-pass serpentine path to achieve full surface coverage. An embodiment of the disclosure can be adjusted to use other dynamic rastering techniques. An embodiment of the disclosure can be adjusted for commercial or large-scale operation by integrating more powerful and/or multiple USPLs into an automated industrial system where in the system is programmed to raster the USPLs at a predetermined speed, angle, and path to achieve the determined results to the target surface and achieve a desired level of surface adhesion.

Figure 7A:
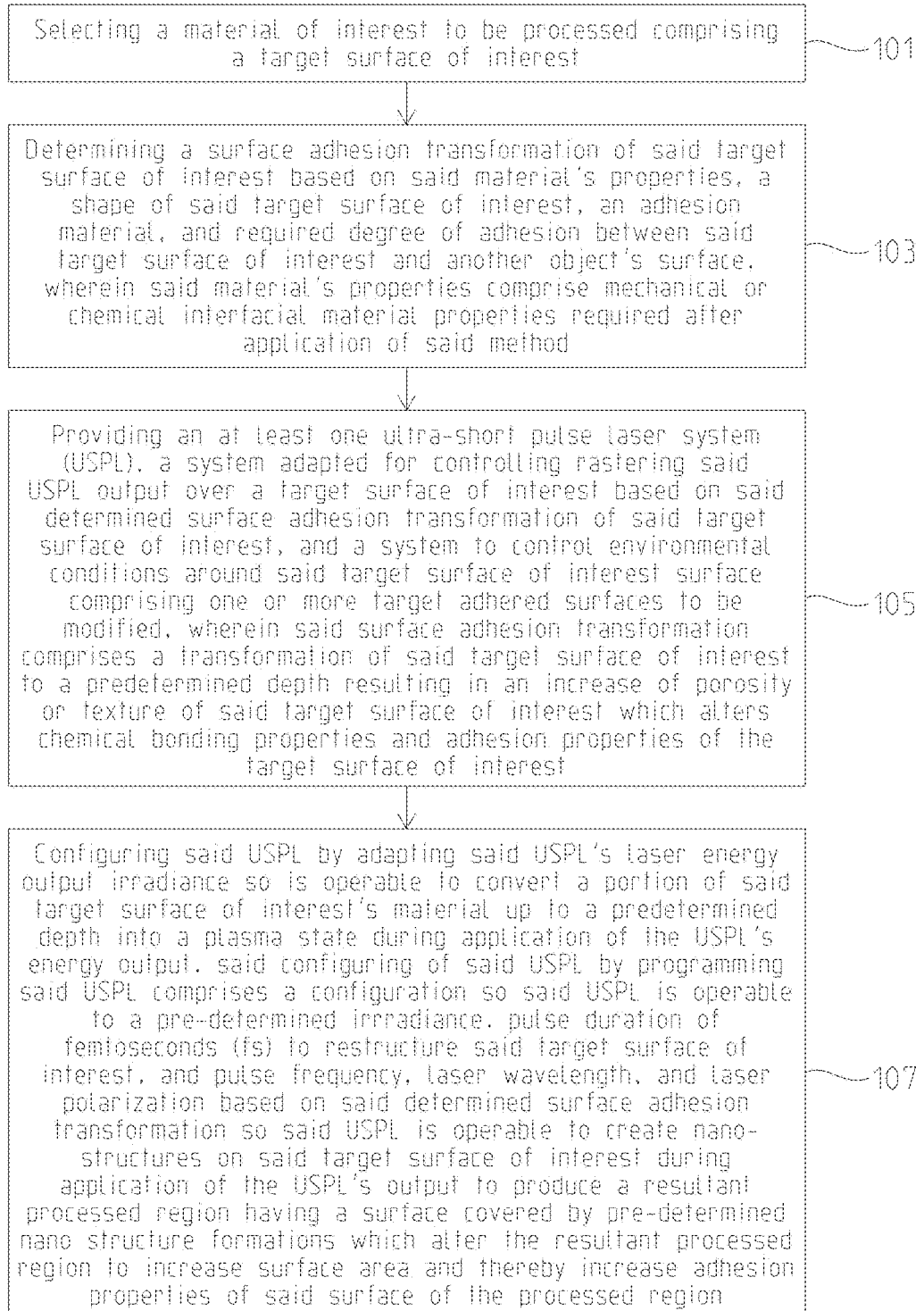
FIGS. 7a and 7b show an exemplary method of processing a material in accordance with one embodiment of the invention.
Figure 7B:
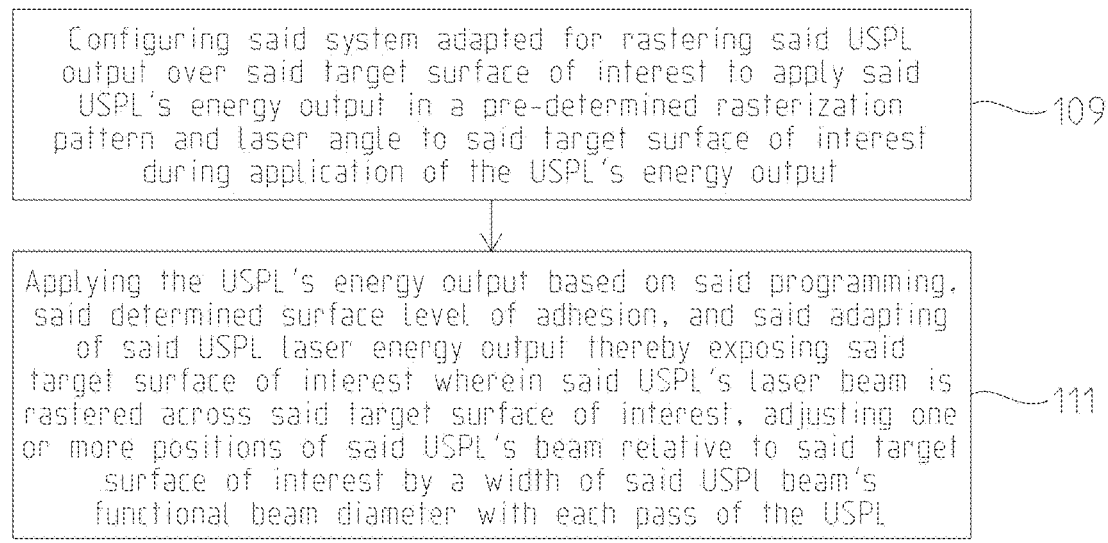

FIGS. 7a and 7b show a method in accordance with an embodiment of the invention. At Step 101: selecting a material of interest to be processed comprising a target surface of interest. At Step 103, determining a surface adhesion transformation of said target surface of interest based on said material's properties, a shape of said target surface of interest, an adhesion material, and required degree of adhesion between said target surface of interest and another object's surface, wherein said material's properties comprise mechanical or chemical interfacial material properties required after application of said method. At Step 105: providing an at least one ultra-short pulse laser system (USPL), a system adapted for controlling rastering said USPL output over a target surface of interest based on said determined surface adhesion transformation of said target surface of interest, and a system to control environmental conditions around said target surface of interest surface comprising one or more target adhered surfaces to be modified, wherein said surface adhesion transformation comprises a transformation of said target surface of interest to a predetermined depth resulting in an increase of porosity or texture of said target surface of interest which alters chemical bonding properties and adhesion properties of the target surface of interest. At Step 107: configuring said USPL by adapting said USPL's laser energy output irradiance so is operable to convert a portion of said target surface of interest's material up to a predetermined depth into a plasma state during application of the USPL's energy output, said configuring of said USPL by programming said USPL comprises a configuration so said USPL is operable to a pre-determined irradiance, pulse duration of femtoseconds (fs) to restructure said target surface of interest, and pulse frequency, laser wavelength, and laser polarization based on said determined surface adhesion transformation so said USPL is operable to create nano-structures on said target surface of interest during application of the USPL's output to produce a resultant processed region having a surface covered by pre-determined nano structure formations which alter the resultant processed region to increase surface area and thereby increase adhesion properties of said surface of the processed region. At Step 109: configuring said system adapted for rastering said USPL output over said target surface of interest to apply said USPL's energy output in a pre-determined rasterization pattern and laser angle to said target surface of interest during application of the USPL's energy output. At Step 108: applying the USPL's energy output based on said programming, said determined surface level of adhesion, and said adapting of said USPL laser energy output thereby exposing said target surface of interest wherein said USPL's laser beam is rastered across said target surface of interest, adjusting one or more positions of said USPL's beam relative to said target surface of interest by a width of said USPL beam's functional beam diameter with each pass of the USPL.

An alternative embodiment can include varying the laser's processing parameters so as to result in a variety of different surface effects. An example of a parameter that can be altered is varying environmental conditions at the sample surface during laser processing. This change in environmental conditions can be used to alter the resultant surface chemistry thus allowing chemical bonding between an adherend surface processed in accordance with an embodiment of the invention and an adhesive. A number of laser parameters may also be varied, including, but not limited to: alternative rastering patterns, laser pulse duration, laser pulse frequency, laser wavelength, laser irradiance (laser power), the polarization of the laser beam, the diameter of the laser spot on the material to be altered, the depth of laser penetration into the surface being processed, and laser angle to material surface in order to alter the resultant surface structure to achieve the desired level or transformation of surface adhesion and/or chemical interfacial properties.

Although the invention has been described in detail with reference to certain preferred embodiments, variations and modifications exist within the spirit and scope of the invention as described and defined in the following claims.

The invention claimed is:

1. A method of treating a material surface comprising:
    selecting a material of interest to be processed comprising a target surface of interest;
    determining a surface adhesion transformation of said target surface of interest based on said material's properties, a shape of said target surface of interest, an adhesion material, and required degree of adhesion between said target surface of interest and another object's surface, wherein said material's properties comprise mechanical or chemical interfacial material properties required after application of said method;
    providing an at least one ultra-short pulse laser system (USPL), a rastering system adapted for controlling rastering of laser energy output of said USPL over said target surface of interest based on said determined surface adhesion transformation of said target surface of interest, and an environmental system to control environmental conditions around said target surface of interest comprising one or more target adhered surfaces to be modified, wherein said surface adhesion transformation comprises a transformation of said target surface of interest to a first depth resulting in an increase of porosity or texture of said target surface of interest which alters chemical bonding properties and adhesion properties of the target surface of interest;
    configuring said USPL by adapting said laser energy output so said USPL is operable to convert a portion of said target surface of interest's material up to a second depth into a plasma state during application of said laser energy output, said configuring of said USPL by programming said USPL comprises a configuration so said USPL is operable to a pre-determined irradiance, pulse duration of femtoseconds (fs) to restructure said target surface of interest, and pulse frequency, laser wavelength, and laser polarization based on said determined surface adhesion transformation so said USPL is operable to create nano-structures on said target surface of interest during application of said laser energy output to produce a resultant processed region having a surface covered by pre-determined nano structure formations which alter the resultant processed region to increase surface area and thereby increase adhesion properties of said surface of the processed region;
    configuring said system adapted for rastering said laser energy output over said target surface of interest to apply said laser energy output in a pre-determined rasterization pattern and laser angle to said target surface of interest during application of said laser energy output; and
    applying said laser energy output based on said programming, said determined surface level of adhesion, and said adapting of said laser energy output thereby exposing said target surface of interest wherein a laser beam of said USPL is rastered across said target surface of interest, adjusting one or more positions of said laser beam relative to said target surface of interest by a width of a functional beam diameter of said laser beam with each pass of the USPL.

2. The method of claim 1, further comprising:
    applying a pre-determined variance of processing parameters of said laser adapted to result in a pre-determined variety of surface alterations to produce said surface adhesion transformation.

3. The method of claim 1, further comprising:
    applying a pre-determined variance of environmental conditions at said target surface of interest during USPL processing so as to alter resultant surface chemistry of said target surface of interest and thereby resulting in increased chemical bonding properties of the resultant processed region which comprises an adherend surface.

4. The method of claim 1, further comprising:
    providing multiple said USPLs integrated into an automated industrial system adapted to raster multiple said laser energy output over said target material of interest's surface.

5. The method of claim 1, wherein said material of interest to be processed is a metal.

6. The method of claim 1, wherein said material of interest to be processed is a non-metal.

7. The method of claim 5, wherein said material of interest to be processed is a bulk material.

8. The method of claim 6, wherein said material of interest to be processed is a bulk material.

9. The method of claim 1, further comprising:
    programming said system of rastering said USPL based on said material of interest, in a pre-determined pattern, speed, and depth of said USPL beam penetration in order to athermally restructure said target surface of interest to produce said surface adhesion transformation.

10. The method of claim 1, wherein said by pre-determined nano structure formations comprise an increase in three dimensional structures in said surface of interest so as to increase total surface area and provide a plurality of protrusions from said target surface area comprising said pre-determined nano structure formations.

11. The method of claim 1 wherein said step of configuring said USPL by adapting said laser energy output comprises configuring said USPL so it is operable to athermally convert said target surface of interest's material into said plasma state which permits redeposition of said material onto said target surface.

12. The method of claim 1, wherein the first depth is a value such that the nano-structures on said target surface of interest are above an original height of said target surface of interest.

13. The method of claim 1, wherein when said USPL creates nano-structures on said target surface of interest, the mass of material remains approximately constant and a surface area of the target surface of interest increases.

14. The method of claim 1, wherein said transformation of said target surface of interest to the first depth increases porosity of said target surface.

15. The method of claim 14, wherein when said transformation of said target surface of interest to the first depth increases porosity of said target surface, surface adhesion of said target surface increases.

* * * * *